United States Patent [19]

Sanger et al.

[11] Patent Number: 5,291,221
[45] Date of Patent: Mar. 1, 1994

[54] METHOD AND APPARATUS FOR THE CALIBRATION OF A MULTICHANNEL PRINTER

[75] Inventors: Kurt M. Sanger, Rochester; Thomas A. Mackin, Mackin; Michael E. Schultz, Rochester, all of N.Y.

[73] Assignee: Eastman Kodak Company, Rochester, N.Y.

[21] Appl. No.: 749,056

[22] Filed: Aug. 23, 1991

[51] Int. Cl.⁵ ............................................. G01D 15/10
[52] U.S. Cl. ................................... 346/76 L; 346/160
[58] Field of Search ...................... 346/154, 160, 76 L, 346/108

[56] References Cited

U.S. PATENT DOCUMENTS

| | | | |
|---|---|---|---|
| 4,030,106 | 6/1977 | Bestenreiner et al. | 346/154 X |
| 4,074,318 | 2/1978 | Kapes, Jr. | 358/230 |
| 4,455,562 | 6/1984 | Dolan et al. | 346/154 |
| 4,710,779 | 12/1987 | Funaki et al. | 346/76 L X |
| 4,857,944 | 8/1989 | Hart et al. | 346/154 |
| 4,878,072 | 10/1989 | Reinten | 346/154 |
| 4,897,672 | 1/1990 | Horiuchi et al. | 346/160 X |
| 4,999,673 | 3/1991 | Bares | 346/108 X |
| 5,097,342 | 3/1992 | Agano | 346/108 X |
| 5,146,241 | 9/1992 | Ferschl | 346/108 |
| 5,146,242 | 9/1992 | Zielinski | 346/108 |
| 5,164,242 | 11/1992 | Baek et al. | 346/76 L |
| 5,220,348 | 6/1993 | D'Aurelio | 346/76 L |

Primary Examiner—A. T. Grimley
Assistant Examiner—Nestor R. Ramirez
Attorney, Agent, or Firm—Robert L. Randall

[57] ABSTRACT

A method and apparatus are disclosed for the calibration of a multichannel printer. The printer comprises a plurality of diode lasers which are modulated in accordance with an information signal. Radiation from the diode lasers is imaged onto a receiving medium such as a thermal print medium. The thermal print medium is supported on a drum which is rotatable about an axis. In order to balance the output from the diode lasers, test patterns are formed on the receiving medium with each of the lasers using known power inputs. The density of each of the test patterns is measured, and the density values obtained are correlated with the input power levels for each of the lasers. The measurement of densities produced by a single laser is facilitated by slowing the print head down by a factor of the number of lines normally printed and writing with one line source at a time.

10 Claims, 4 Drawing Sheets

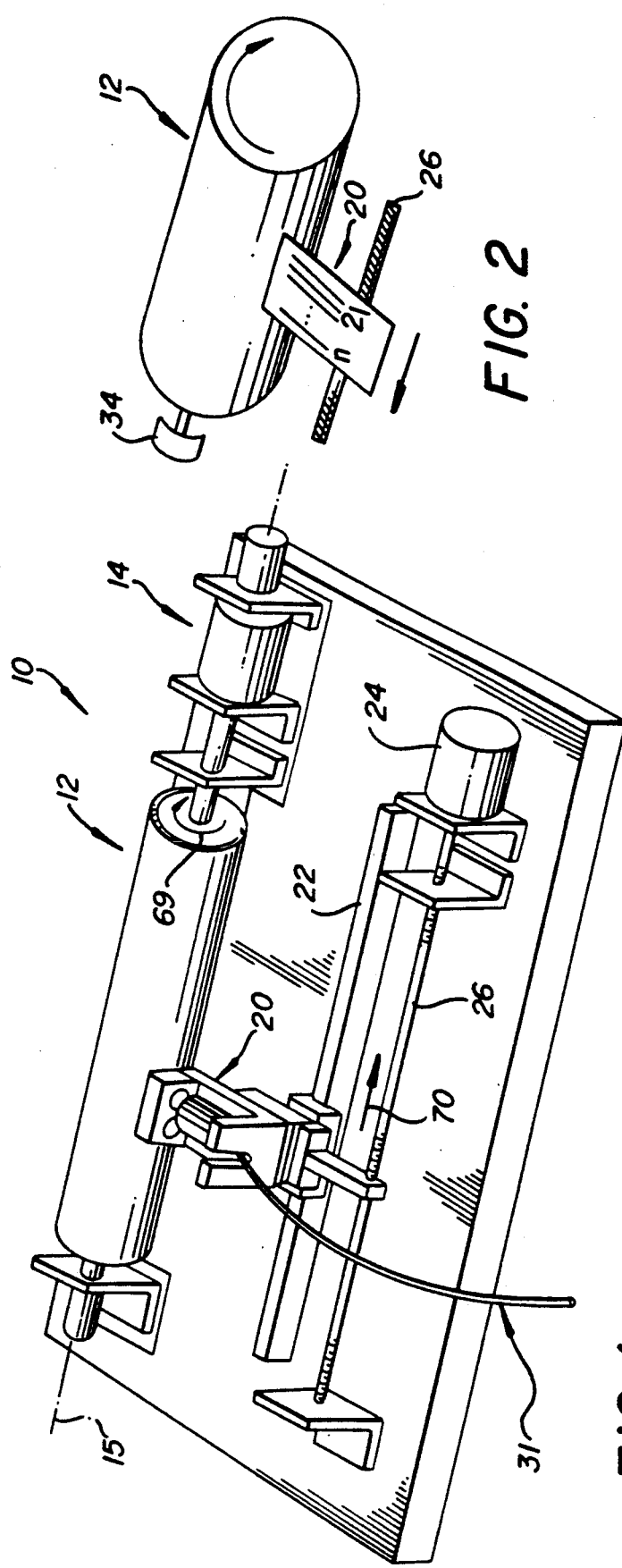
FIG. 1
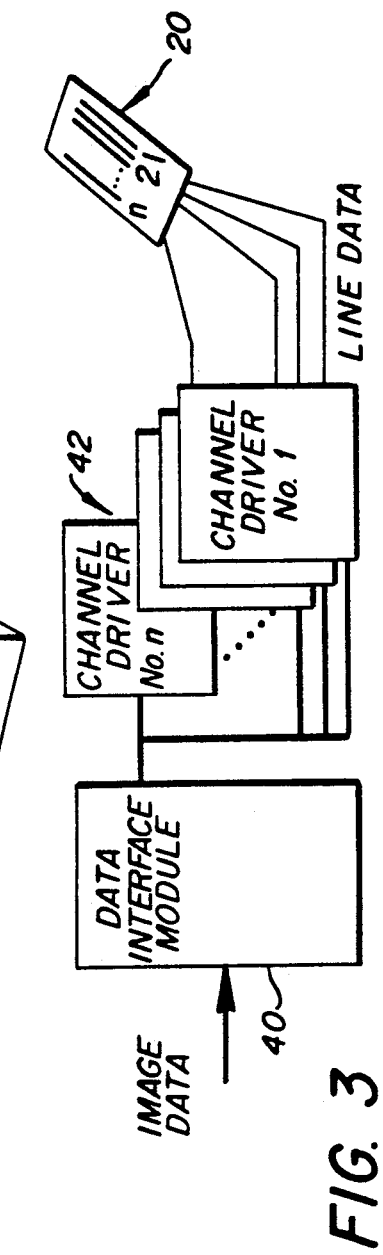
FIG. 2
FIG. 3

METHOD AND APPARATUS FOR THE CALIBRATION OF A MULTICHANNEL PRINTER

BACKGROUND OF THE INVENTION

1. Cross-Reference to Related Applications

Reference is made to U.S. patent application Ser. No. 724,059, entitled "Method and Apparatus for Scanning a Receiving Medium," filed on Jul. 1, 1991, in the names of S. H. Baek et al.; Ser. No. 724,061, entitled "Method and Apparatus for Scanning a Receiving Medium," filed on Jul. 1, 1991, in the names of Baek, Mackin, Firth, and Woo; and Ser. No. 724,060, entitled "Method and Apparatus for Scanning a Receiving Medium," filed on Jul. 1, 1991, in the names of Mackin et al. Reference is also made to U.S. patent application Ser. No. 749,031, entitled "A Method of Calibrating a Multichannel Printer," filed on even date herewith in the name of Sanger et al. All of these applications are assigned to the assignee of the present invention.

2. Field of the Invention

The present invention relates to the calibration of a multichannel printer, and more particularly, to the calibration of such a printer in order to eliminate artifacts in an image produced thereby.

3. State of the Prior Art

In one type of scanner apparatus, a photosensitive material is supported on a rotatable drum, and a print head carrying a light source is advanced relative to the photosensitive material by means of a lead screw. The light source is modulated in accordance with an information signal to form an image on the photosensitive material. In order to increase the output of such apparatus, multiple light sources are mounted in the print head so that a plurality of print lines can be formed in a single pass. In multiline scanning systems, any difference of densities among the lines can create very severe artifacts in the image. These artifacts can appear as repetitive patterns known as "banding."

The problem of banding can be particularly troublesome in half-tone printing where, for example, 12 mini-pixels are used to write a half-tone dot. Visible lines in the image, caused by unevenness in the densities of the lines, can come at a different section of each successive half-tone dot, and thus, cycle across the image. The visible lines can be due, for example, to a variation in the intensity of the light sources. The frequency of the visible lines in the image beats with the half-tone dot frequency. The resulting macro density variation can have a spatial frequency in the image which, unfortunately, matches the frequency at which the eye is most sensitive, that is, at about 0.5 cycle/mm. At this frequency range, the typical human eye can see a variation of density of around 0.2%. This small level of unevenness in density is very hard to control in a printer using a multiline print head.

The aforementioned U.S. Patent Applications are directed to solutions to the problem of artifacts in images created by printers. In certain of the applications, random noise is introduced into the control signals of the printer in order to mask artifacts in an image produced by the printer. Other techniques have been used in the art to overcome the problems of image artifacts. For example, certain multiline film writers are capable of printing half-tone images, without artifacts, by using a high gamma film under saturated exposure conditions. Another technique which is used to mask artifacts is to vary the resolution of the film writer. Changing the line-to-line pitch and the line width of the film writer permit a selection of resolution which will limit artifacts at the desired half-tone ruling and screen angle. A disadvantage of increasing resolution is that it also increases both the amount of data required and the time to make each image.

Multiple writing beams can be formed from a single light single source by using beam splitter optics. Such a system will typically write six lines at a time. In these systems, the problem of balancing each writing line may be less severe, since the same light source is used for all of the lines; however, the intensity of light provided to each line is necessarily considerably reduced. None of the known prior-art solutions to the problem of artifacts in images produced by multiline printers is totally satisfactory, however, particularly when the writing is being done on mediums such as a thermal print medium.

SUMMARY OF THE INVENTION

It is an object of the present invention to overcome the problems in the prior art discussed above and to provide an improved method and apparatus for calibrating a multichannel printer.

In accordance with one aspect of the present invention, there is provided a method of calibrating a multichannel printer, the printer having a plurality of light sources which are projected onto a receiving medium responsive to radiation, the method comprising the steps of: sequentially directing radiation from each of the light sources onto a receiving medium to form a test pattern thereon, the test pattern including a plurality of test patches, each of the test patches being formed by radiation from one of the light sources produced by a known input; measuring the density of each of the test patches and correlating the input of each of the light sources with the measured density of the respective test patch; and determining the inputs for each of the sources to obtain desired densities on said receiving medium.

In accordance with another aspect of the present invention, there is provided apparatus for calibrating a multichannel printer, the printer having a print head which includes a plurality of light sources, the apparatus comprising: means for directing radiation from the print head onto a receiving medium responsive to radiation in order to form a plurality of lines thereon; and means for controlling the directing means to form a plurality of test patches on the receiving medium, each of the test patches being formed by radiation from one of the light sources.

The present invention can be used in a printer which is adapted to form an image on a thermal print medium. The printer includes a rotatable drum for supporting the print medium, and a print head which is moved relative to the print medium by means of a lead screw. The print head includes an array of optical fibers and a lens for focussing the ends of the fibers onto the medium. Each of the fibers is connected to a diode laser which is modulated in accordance with an information signal. In order to balance the output from the diode lasers, the power output from each of the lasers is measured, and the power measurements are correlated with the power inputs to the lasers. Test patterns are then formed on the receiving medium with each of the lasers using known power inputs. The density of each of the test patterns is measured, and the density values obtained are correlated with the input levels for each of the lasers. The measurement of single laser densities is facilitated by slowing the print head down by a factor of the number of lines normally printed and writing with one line source at a time.

A principal advantage of the present invention is that apparatus calibrated in accordance with the invention can produce an image free of artifacts in both half-tone and continuous-tone printing. A further advantage is that increased resolution can be obtained in both modes of operation. A still further advantage of the present invention is that an image free of artifacts can be produced without the need to modify the printer apparatus.

Other features and advantages will become apparent with reference to the following description of the preferred embodiment when read in light of the attached drawings.

BRIEF DESCRIPTION OF THE DRAWINGS

FIG. 1 is a perspective view of a multichannel laser thermal printer;

FIG. 2 is a schematic view of the drum and print head of the multichannel printer;

FIG. 3 is a diagram showing the data path of the multichannel printer;

DESCRIPTION OF THE PREFERRED EMBODIMENTS

Figure 4:
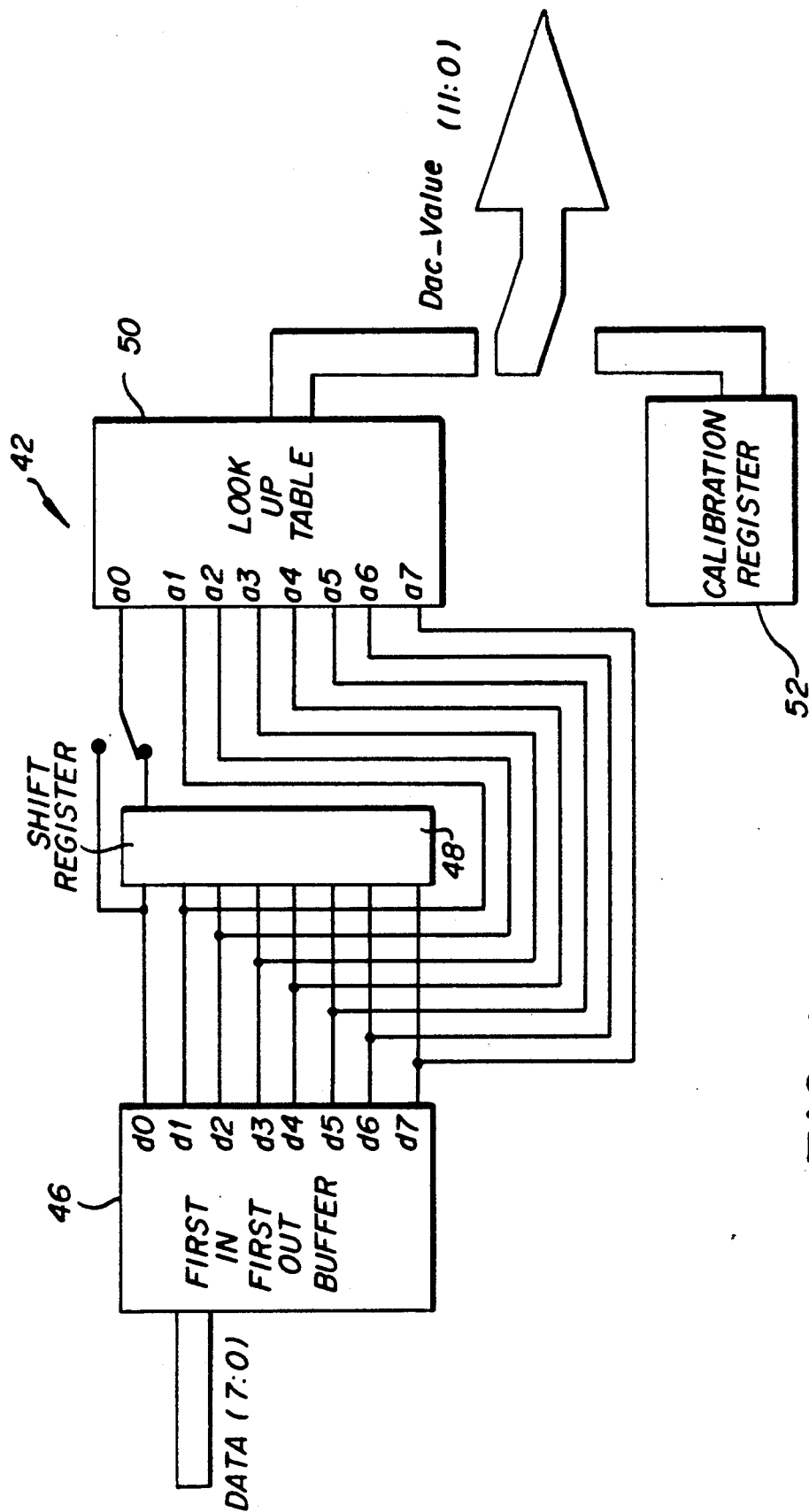
FIG. 4 is a schematic view of a channel driver.

The present invention can be used in a multichannel printer such as laser thermal printer 10 shown in FIG. 1. Printer 10 comprises a drum 12 which is mounted for rotation about an axis 15 and is driven by a motor 14. Drum 12 is adapted to support a thermal print medium, not shown, of a type in which a dye is transferred by sublimation from a donor to a receiver as a result of heating the dye in the donor. A thermal print medium for use with the printer 10 can be, for example, a medium disclosed in U.S. Pat. No. 4,772,582, entitled "Spacer Bead Layer for Dye-Donor Element Used in Laser Induced Thermal Dye Transfer", granted Sep. 20, 1988. This patent is assigned to the assignee of the present invention.

A print head 20 is movably supported adjacent drum 12. Print head 20 is supported for slidable movement on a rail 22, and the print head 20 is driven by means of a motor 24 which rotates a lead screw 26. Print head 20 comprises an array of optical fibers 31 which are connected to a plurality of light sources such as diode lasers (not shown). The diode lasers can be individually modulated in a well-known manner to selectively direct light from the optical fibers onto the thermal print medium. A more complete description of the thermal printer described herein can be found in U.S. application Ser. No. 451,655, filed on Dec. 18, 1989, in the names of Seung H. Baek et al., and the disclosure in this application is expressly incorporated herein by reference.

In multichannel printers, any difference in the density of the print lines creates a very severe artifact known as banding. This artifact can be due, for example, to unbalanced laser power, and the artifact is particularly troublesome in half-tone printers. In half-tone printers, it takes, for example, 12 mini-pixels to write a half-tone dot. The printing swath may sometimes be less than 12 mini-pixels, and as a result, a darker line (or several darker lines) comes at a different section of each sequential half-tone dot; these darker lines cycle across the image. The frequency of the lines of uneven density beats with the half-tone dot frequency and is visually observed in the image as banding. The resulting macro density variation can have a spatial frequency in the image which matches with the greatest contrast sensitivity of the eye.

In the present invention, the light source in each of the channels is precisely calibrated in order to overcome the problem of banding. A target image is formed with each light source independently. Density transmittance measurements on the target images are used to balance each laser. Power measurements can be made periodically during the operation of the instrument to track the performance of each light source.

The measurement of single-line print densities is facilitated by slowing the lead screw down by a factor of the number of lines normally printed, and writing with one line source at a time. This produces an image made using a single channel at the normal line-to-line spacing. The print density is measured with a conventional densitometer. Single line densities are referred to herein as single laser densities or (SLD's). A single writing channel or single line is referred to as a single laser.

Measuring print densities on a line-by-line basis provides a means to account for differences in the output of the individual lasers. This method of balancing does not require that all of the individual factors affecting laser output be measured or even that all of the significant contributors be known. Once the lasers have been balanced, routine power measurements can be made to track the performance of the writing engine over the lifetime of the machine. This is a simpler and less time consuming method than repeatably printing single line densities to track each laser over time.

In one embodiment of the present invention, the following steps are performed: (1) single laser density (SLD) target images are printed on a receiving medium using known inputs (DAC values) for each laser; (2) the target images are then measured with a densitometer, and the measured SLD's are correlated with the DAC values for each source; (3) DAC values needed to obtain a given single laser density are then computed, using the SLD versus DAC value relationship calculated in step 2; (4) solid area densities (SAD's) are printed using all of the lasers in the print head 20 to print selected sets of SLD's. For a desired SLD in this step, each laser would be set to the DAC value which has been found to produce that SLD; and (5) a regression is calculated between the SAD values and SLD values. As a result of the foregoing steps, a given SAD can be produced by using the corresponding SLD found in step 3.

The above steps can be repeated as needed to maintain the balance among the separate channels in printer 10. However, it is preferable to perform power measurements in order to maintain balance, once the relationship between SLD and DAC values is defined for each channel. Thus, to maintain balance of the channels over time using power measurements, the following six steps are performed: (1) the power for each laser versus the input (DAC value) is measured; (2) single laser density (SLD) target images are printed using known power levels for each laser; (3) the target images are then measured with a densitometer and the density values obtained are correlated with the input values for each source; (4) the power of each laser is remeasured when rebalance of the system is found to be necessary; (5) DAC Values to obtain a given SLD are readjusted using the latest power data measured in step 4, and the original single laser density versus power relationship calculated in step 3; and (6) solid area densities (SAD's) are printed using all of the lasers in print head 20 to print selected sets of single laser densities. A regression is then calculated between SAD values and SLD values. Thus, when a particular SAD is desired, the corresponding SLD can readily be determined.

Performance of the steps described in the preceding paragraph will now be described with reference to FIGS. 1 and 2. The single laser power at the revolving drum 12 is proportional to the DAC value for that laser. In step 1, the print head 20 is moved to a calibration station 34, shown in FIG. 2. The analog output of a calibration sensor (not shown) at calibration station 34 is fed into an analog-to-digital converter (not shown). The calibration sensor can be, for example, a SD 444-4141-261 sensor, obtainable from Silicon Detector Corp. Analog-to-digital converter counts (ADC values) are proportional to the power detected by the calibration sensor, and ADC values for a set of DAC values are measured for each laser. A linear regression is performed on the data for each channel to model the power (ADC Value) as a function of DAC value. Equation 1, shown below, is the model used.

$$(ADC\ Value) = m1 * (DAC\ Value) + b1 \quad (1)$$

$$(DAC\ Value) = [(ADC\ Value) - b1]/m1 \quad (2)$$

where m1 is the slope and b1 is the intercept.

In step 2, a set of ADC values are selected which will produce workable single laser densities (SLD's). The DAC values required to obtain this set of ADC values are calculated using Equation 2. Single laser densities are printed by turning on one channel at a time and slowing the speed of lead screw 26 down to one line width per revolution of the drum 12.

Normally, lead screw 26 is driven at a speed which will translate the print head 20 a distance equal to the width of the number of lines written during one revolution of the drum 12. For example; if the spacing of the lines is 100 lines per mm. and the number of writing lines is ten, the print head 20 would be moved, as follows.

[10 lines * 1 mm/100 lines] = 0.1 mm. per revolution of the drum.

During single laser tests the print head will be slowed down to:

[1 line * 1 mm/100 lines] = 0.01 mm per revolution of the drum.

The resulting test image when printed using a single laser source will have the same line spacing as a normal image formed with a print head having ten lasers.

In step 3, the single laser densities are measured using an ordinary densitometer, for example, a X-Rite 408G densitometer. The resulting single laser densities are plotted against the known ADC values. A simple linear regression is performed to calculate the slope and intercept for the model shown in the following equation for each channel.

$$SLD = m2 * (ADC\ Value) + b2 \quad (3)$$

In Step 4 the print head is again moved to the calibration station 34. ADC counts for a set of DAC values are remeasured for each laser. A linear regression is performed on the data for each laser channel to model the power (ADC Value) as a function of DAC value. Equation 4, shown below, is the model used. Step 4 is repeated as needed to track the performance of each laser over the life of printer 12.

$$(New\ ADC\ Value) = m3 * (DAC\ Value) + b3 \quad (4)$$

In Step 5 the slopes and intercepts calculated in the previous steps are used to calculate the DAC Value that will result in a required single laser density. The following equation is used to calculate the required DAC value to obtain a requested SLD.

$$DAC\ Value\ Required = \{m1*[(SLD-b2)/m2] + b1 - b3\}/m3 \quad (5)$$

The final step, Step 6, is directed to printing solid area densities (SAD's) using all of the lasers to print selected sets of balanced single laser densities (SLD's). A linear regression is performed to relate SAD values to SLD values using the model in the following equation:

$$SAD = m4 * SLD + b4 \quad (6)$$

Equation 7, shown below, is used to calculate the required single laser density when it is desired to produce a print at a particular solid area density. Equation 5 is then used to determine the DAC value to be used for each laser channel.

$$SLD = (SAD - b4)/m4 \quad (7)$$

In the calibration of a multichannel printer according to the present invention, individual laser channels can be balanced without measuring or knowing all of the factors which cause the densities produced by the different channels in the printer to be different. Some of the factors which may contribute to differences in density are: the spot size of each channel, the wavelength of each laser source, and the modes that each source emits through the print head. Since these factors can vary from laser to laser, the densities produced by the lasers can be different even when the power output from the lasers is the same. Thus, the correlation of the SLD's with the measured power outputs of the lasers is an important feature of the invention The ability to eliminate artifacts by precisely balancing each channel permits an increase in the number of lines printed at one time, thereby decreasing the total time required to make a print. By using power measurements to track subtle changes in laser channel performance, measurement of the single laser densities only needs to be done once. As a result of using the technique of slowing the lead screw 26 to a rate of one line per revolution of the drum, complex microdensitometry is not required in the calibration process.

With reference to FIGS. 3-6, additional methods will now be described for obtaining the desired test areas from each of the lasers in print head 20. In one method, a test pattern is created which includes a plurality of test patches formed during the revolution of the drum 12. Each test patch is created using a different laser. This method makes it possible to print all n lasers during the same amount of time that the method described above prints one laser. Another method uses each laser to print test patches while the drum rotates, each test patch being exposed at a different power level.

In the schematic drawing of multichannel printer 10 shown in FIG. 2, print head 20, containing n channels, is moved relative to revolving drum 12 which supports a thermal print medium (not shown). In the normal operation of printer 10, the print head 20 moves a distance equal to n lines for each revolution of drum 12. Modulated data is sent to each of the n channels to expose the media in accordance with an information signal in order to create an image on the medium. The power level of each channel is adjusted to produce a desired density.

The data path for printer 20 is shown in FIG. 3. A data interface module 40, (DIM), presorts the Image Data and sends it to the appropriate channel driver 42. For example, if the image data is sent one line at a time, the data interface module 40 will transfer the first line to channel 1, the second line to channel 2, the $n^{th}$ line to channel n, and the $n^{th}+1$ line to channel 1. The channel drivers 42 buffer and deliver the data to each channel in the print head 20 at the correct time. The channel drivers 42 also convert the data from an on or off signal to optical on and off power levels. A more detailed drawing of a channel driver 42 shown in FIG. 4.

The data interface module 40 loads 8 bits of data at a time into channel driver 42. In a half-tone printing mode, this data represents 8 bits each of which is either on or off. The 8 bits are stored in a first-in-first-out (FIFO) buffer 46 until all the channels are ready and the drum 12 is up to speed. The 8 bits are then loaded into a shift register 48 and shifted out 1 bit at a time to the lowest address line, (a0), of a look up table 50. The look up table 50 is loaded such that when a0 is a logic low the 12 bit output value is set to the off power level and when a0 is a logic high the 12 bit output value is set to the on power level. The 12 bit DAC Value out of the look up table drives a digital-to-analog converter (not shown). The analog output is fed into a current amplifier (not shown) which drives the laser of one channel.

The channel driver 42 can, alternatively, be configured for continuous-tone printing instead of half-tone printing. In continuous-tone printing each byte, 8 bits, of data sent from the DIM 40 is used to select one of 256 power levels. The shift register 48 is not used, and the data out of FIFO buffer 46 is fed directly into the look up table 50. The look up table 50 is loaded with values which convert the 8 bit input value into 12 bit power levels which result in equal increments in print density.

The channel driver 42 may also be configured to use the calibration path instead of the normal print path. In this configuration, the DAC Value into the digital-to-analog convertor is driven by the calibration register 52 instead of the look up table 50.

During a single laser test, the drive motor 14 for lead screw 26 is driven at 1/n times normal speed. Thus, the print head 20 moves exactly one line width for each revolution of the drum 12. The channel drivers 42 are configured for half-tone printing. A constant solid image is fed into the DIM 40. Only one channel driver 42 out of n is turned on at a time. Data sent from the DIM 40 to the unused channels is ignored. The resulting image contains lines at the correct line spacing which were exposed using only one channel. Single laser tests using this method may also be created by: (1) turning the drum 12 at the normal speed; (2) turning the lead screw at 1/n times the normal speed; and (3) turning on one laser at the desired power level, setting its DAC Value by means of the calibration register 52.

Figure 5:
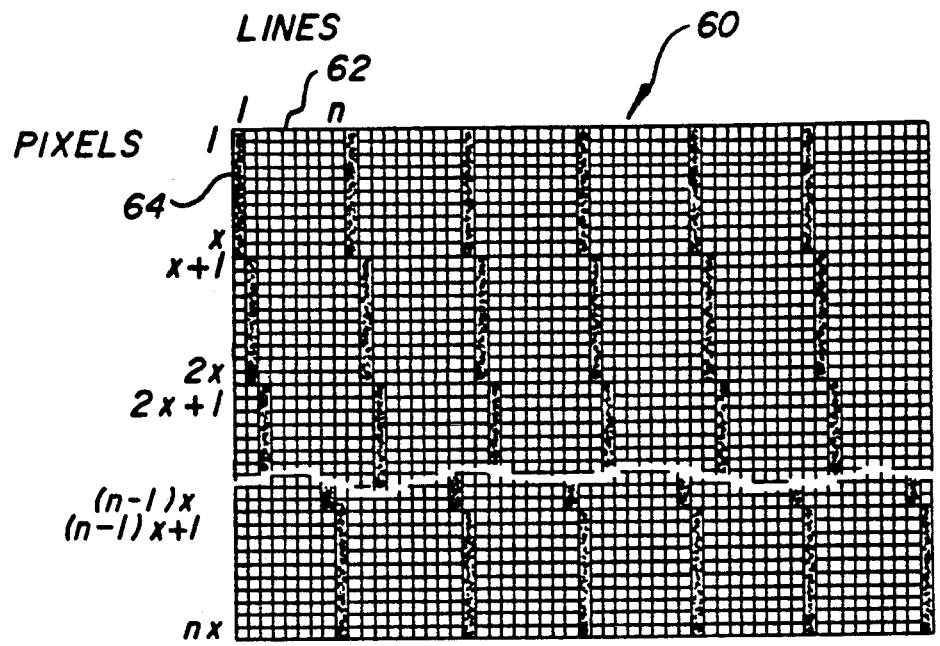
FIG. 5 shows a test pattern generated in accordance with the present invention.

A more efficient method of generating single laser densities is to print a test pattern 60 as shown in FIG. 5. The test pattern 60 repeats after n lines. Lines 1 through n contain x pixels to be printed in a sequence such that if the lines were placed on top of each other their exposed areas would not overlap. When printed at a lead screw speed which moves the printhead one line per revolution of the drum 12 the resulting image will contain n patches 62. Each patch 62 will have been exposed by a separate channel. The test pattern 60 can be generated using an internal pattern generator (not shown), or the necessary instructions can exist as a special line work image file.

In FIG. 5, there is shown a test pattern 60 generated by a print head having 9 channels. Each channel forms one line 64 so n is 9, and each line contains 10 pixels so x is 10. The first line has 10 pixels on, and all other pixels off. No other line in the pattern is on at the same time as line 1. Line n+1 is the same as line 1. Therefore; channel 1 will print during lines 1, n+1, 2n+1, etc. and none of the other channels will be active at the same time. The first 10 pixels in the resultant image will be exposed only by channel 1. The second 10 pixels are exposed only by channel 2, and the last 10 pixels are exposed by channel 9.

The test pattern 60 can be generated by a pattern generator (not shown) internal to the data interface module 40. The pattern generator can contain up to 2047 words in the pattern. For a system with 18 writing channels, for example, the pattern repeats every 18 lines. Each line is 1800 pixels or 225 bytes long. Each line contains 100 pixels that are exposed. The first line contains 100 pixels on, and 1700 pixels off. The second line has 100 pixels off, 100 pixels on, and 1600 pixels off. This sequence continues until the 18th line which contains 1700 pixels off and 100 pixels on. The total pattern length is 2025 words. At a resolution of 1800 pixels per inch the pattern generated would be only 1 inch long. Each patch 64 would be only 0.056 inches long making it difficult to measure with a densitometer. By changing the resolution in the pixel direction to 300 dots per inch, the test pattern 60 is stretched to 6 inches long. Each patch becomes 0.33 inches long, and such a patch can be measured by a densitometer using, for example, a 0.25 inch diameter aperture.

Figure 6:
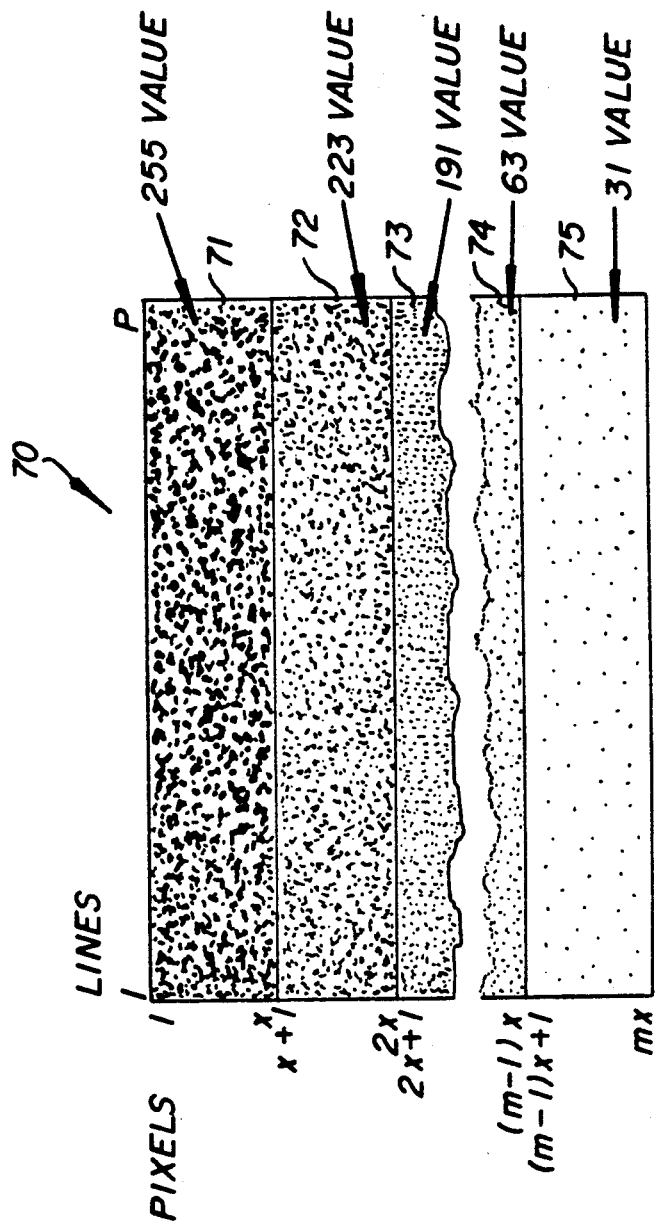
FIG. 6 shows a continuous-tone test pattern generated in accordance with the present invention.

The continuous-tone data path can also be used to create test patches. With reference to FIG. 6, there is shown a continuous-tone pattern 70 which includes test patches 71–75 made at different exposure levels. Patches 71–75 were made at exposure levels of 255, 223, 191, 63, and 31 look up table power levels, respectively. Initially, the look up table 50 is loaded with a linear table so that input power level 255 results in output DAC value 4095 and input power level 0 results in an output DAC value 0. Each of the patches 71–75 was printed with one light source and with the lead screw 26 running at 1/n times the normal rate. In the continuous tone mode, each pixel in the image is sent by the data interface module 40 to the channel drivers 41. The channel drivers 42 pass the 8 bits of pixel data directly to the look up table 50 which sets the DAC Value, thereby controlling the exposure level of each patch.

The data sent from the DIM 40 to the unused channels is ignored. The resulting image will contain test patches formed in the direction of the movement of drum 12.

From the foregoing description of the present invention, it will be seen that by slowing the lead screw velocity to one line width per revolution of the drum the density of a single writing channel out of a multiple number of writing channels can be measured directly using an ordinary densitometer. Test patterns can be created for any multichannel printer, and more than one source can be measured during a single revolution of the drum. On a multichannel continuous-tone printer, a single channel can be used to form multiple patches of different exposures during one revolution of the drum.

Figure 7:
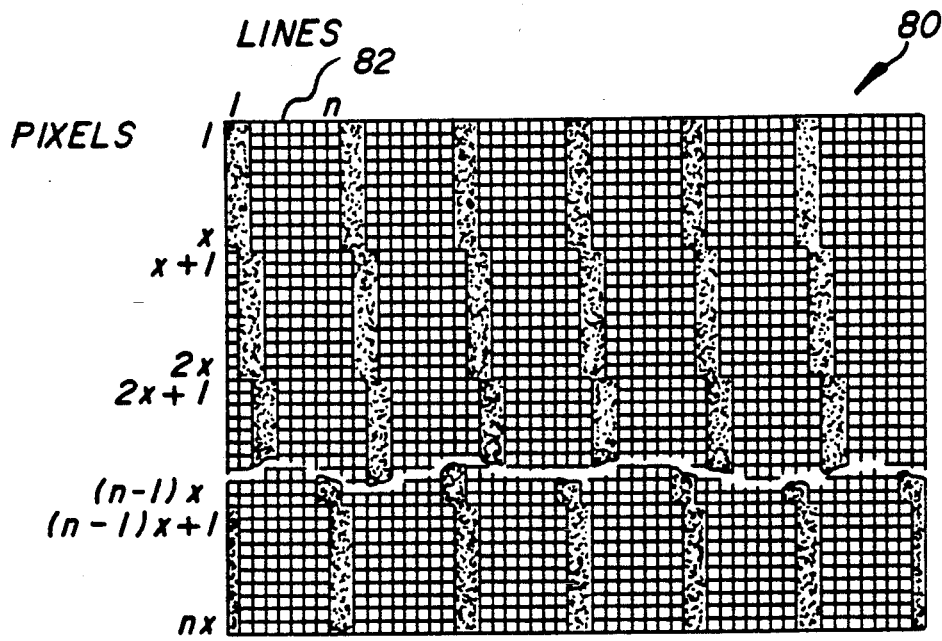
FIG. 7 shows a test pattern generated when two adjacent channels are energized at one time.

The method implemented herein to print single laser densities can be optimized in accordance with the total number of channels in a printer and the number of exposure levels required. Test patterns can be created to efficiently test exposure from a multiple number of individual sources. The test pattern in FIG. 5 could, for example, be modified to change the order in which each source is printed. Other test patterns can be created which allow for exposure as a function of a multiple number of channels. For example, a test pattern 80, shown in FIG. 7, was produced by running the lead screw speed at 2/n times the normal speed. Each test patch 82 in the test pattern 80 is the result of exposure from two adjacent channels simultaneously. Such a test pattern can be used to provide information on channel interaction.

The invention has been described in detail with particular reference to the preferred embodiments thereof, but it will be understood that variations and modifications can be effected within the spirit and scope of the invention.

We claim:

1. A method of printing test patterns with a multichannel printer, said printer having a plurality of "n" of light sources which are projected onto a receiving medium responsive to radiation wherein "n" is an integer, said receiving medium being supported on a rotatable drum and said light sources being mounted on a translator which is driven axially of the drum, said method comprising the steps of:

sequentially directing radiation from each of said light sources onto said receiving medium to form a test pattern thereon, said test pattern including a plurality of test patches, each of said test patches being formed by radiation from a set of said light sources produced by a known input, said set of light sources including one or more "a" adjacent light sources and wherein "a" is a whole integer; and driving said translator at a speed of a/n of the speed which would form successive sets of "n" scan lines.

2. A method, as defined in claim 1, wherein said test patches are formed by actuating each of said light sources in sequence for a predetermined number of pixels.

3. A method, as defined in claim 2, wherein each of said test patches is formed by operating said printer in a half-tone mode.

4. A method, as defined in claim 2, wherein each of said test patches is formed by operating said printer in a continuous-tone mode.

5. A method, as defined in claim 2, wherein test patches are formed by operating each of said light sources at different power settings.

6. A method, as defined in claim 1, wherein each of said test patches is formed by a plurality of light sources.

7. A method, as defined in claim 1, wherein said receiving medium is a thermal print medium.

8. Apparatus for printing test patterns with a multichannel printer, said printer having a print head which includes means for imaging radiation from a plurality of "n" of lasers onto a receiving medium which is responsive to radiation wherein "n" is an integer, said apparatus comprising:

means for supporting said receiving medium;

means for effecting relative movement between said print head and said receiving medium in a scan direction and a cross scan direction; and means for sequentially directing radiation from each of said lasers onto said receiving medium to form a test pattern thereon, said test pattern including a plurality of test patches, each of said test patches being formed by the radiation from a set of said lasers, said set of said lasers including one or more "a" adjacent lasers and wherein "a" is an integer; and means for driving said relative movement means in a cross scan direction at a speed of a/n of the speed which would form successive sets of "n" scan lines.

9. Apparatus, as defined in claim 8, wherein said apparatus includes means for measuring the power output of each of said lasers.

10. Apparatus, as defined in claim 8, wherein said receiving medium is a thermal medium.

* * * * *